No. 633,214. Patented Sept. 19, 1899.
J. C. PERRY.
MACHINE FOR ELECTRICALLY WELDING WIRE FABRICS.
(Application filed Jan. 21, 1899.)
(No Model.) 3 Sheets—Sheet 1.
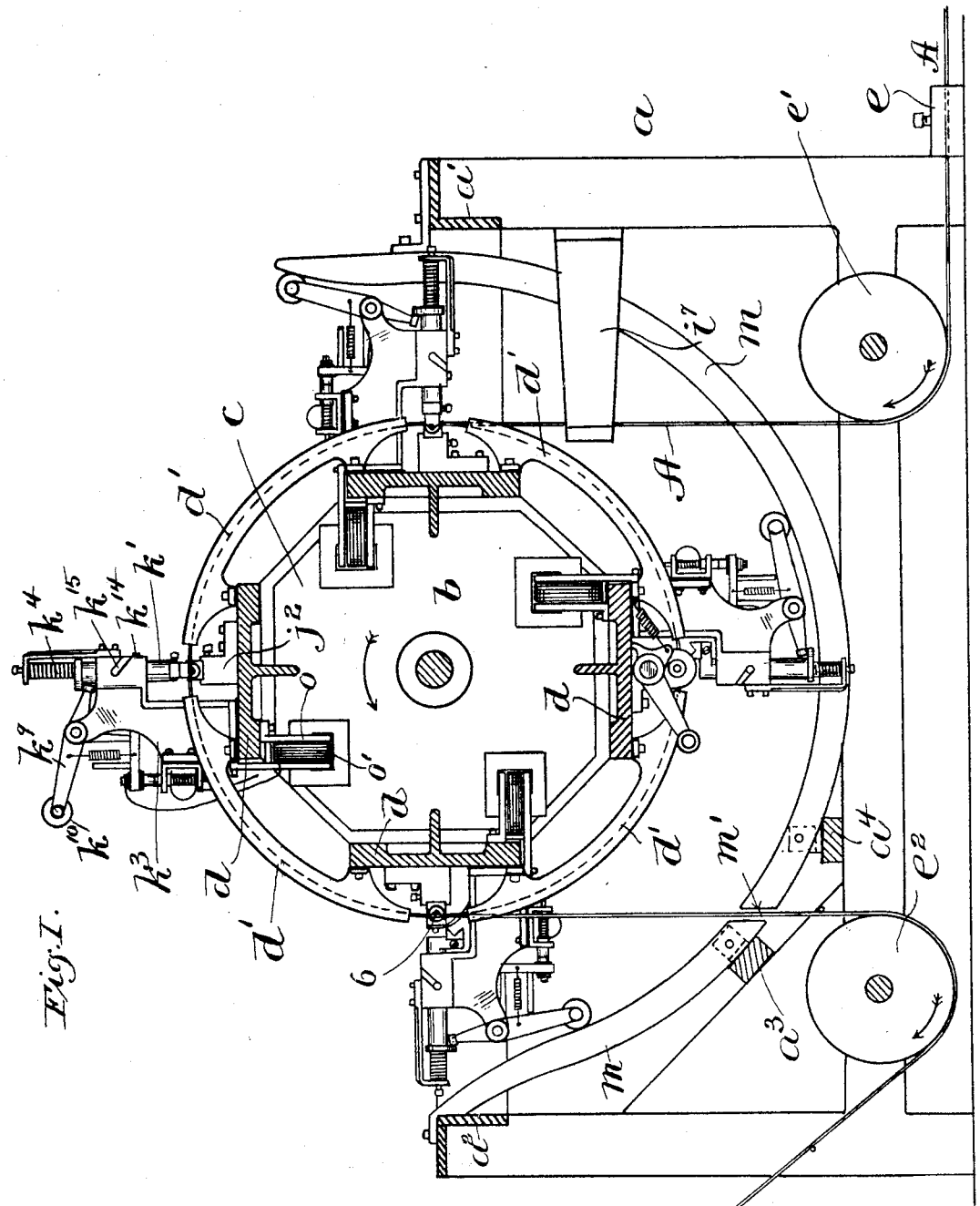

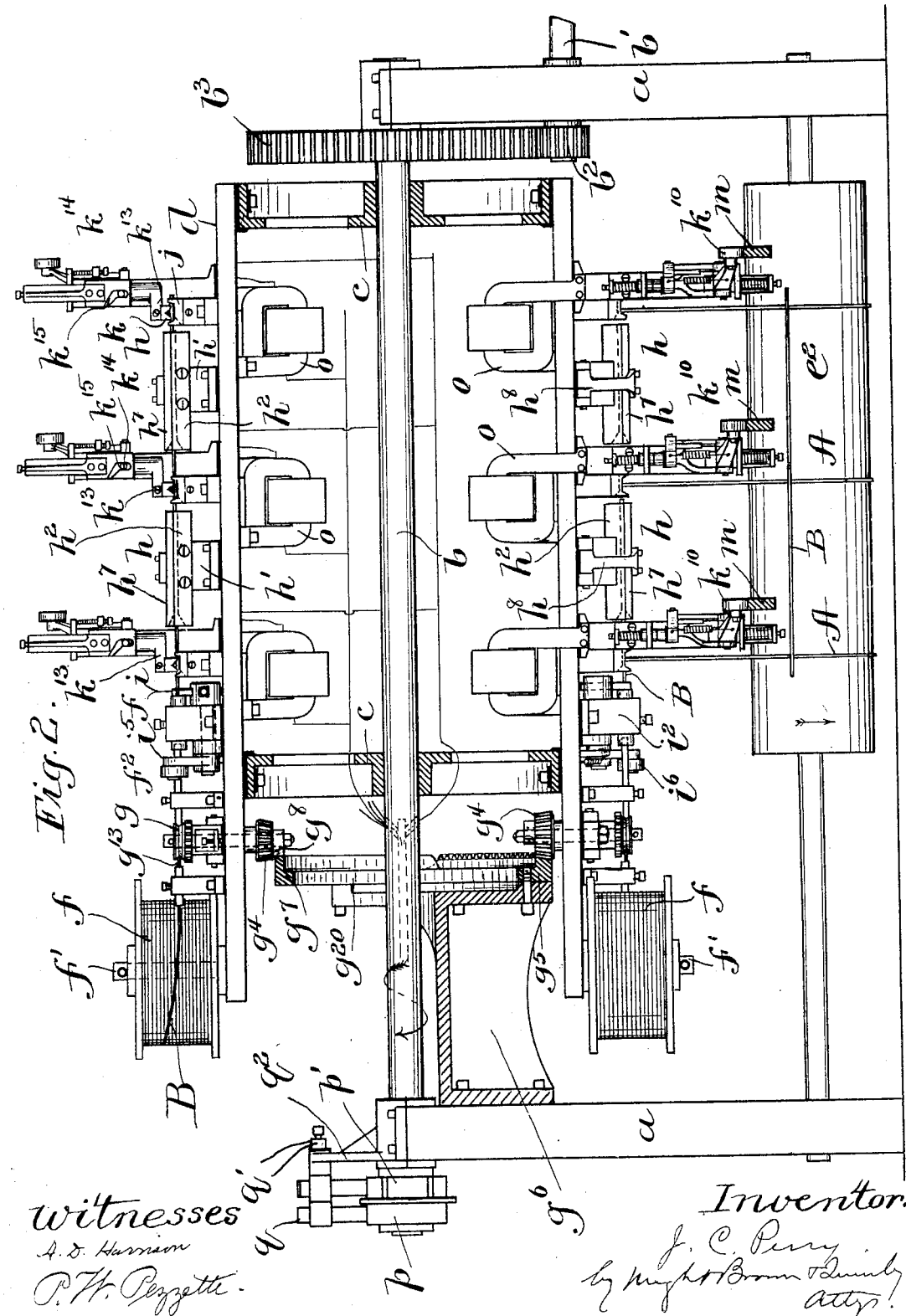

No. 633,214. Patented Sept. 19, 1899.
J. C. PERRY.
MACHINE FOR ELECTRICALLY WELDING WIRE FABRICS.
(Application filed Jan. 21, 1899.)
(No Model.) 3 Sheets—Sheet 3.
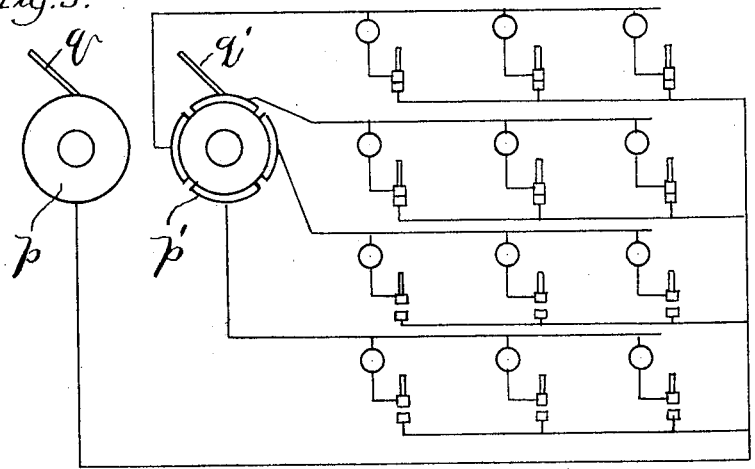
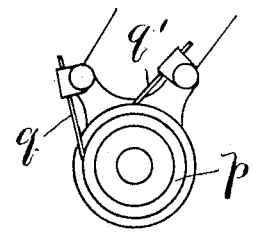
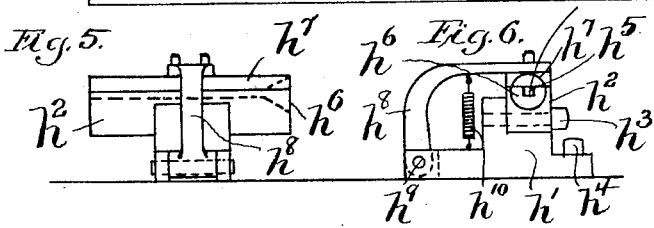
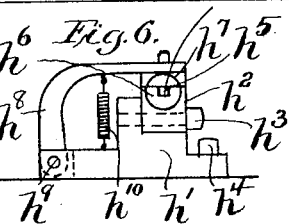
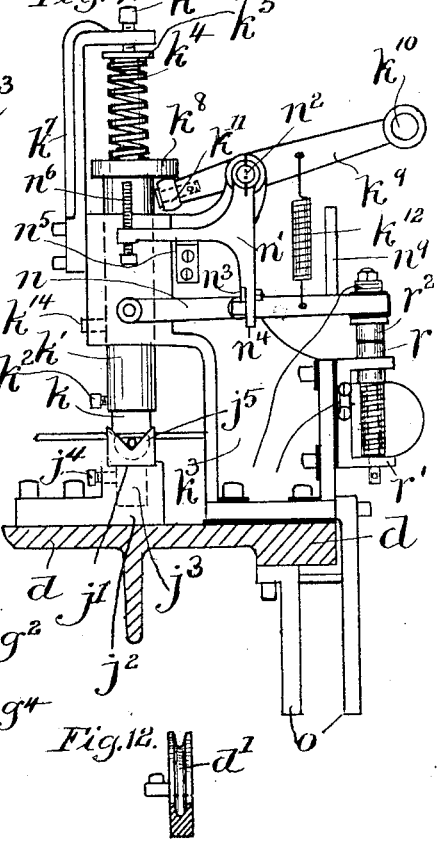
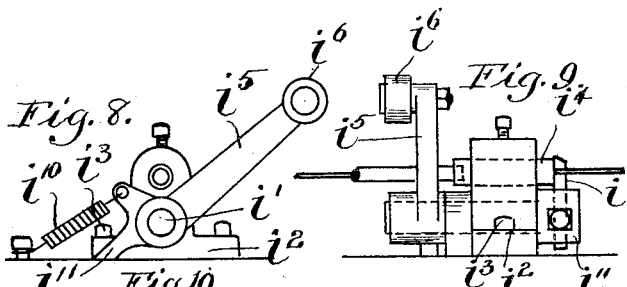
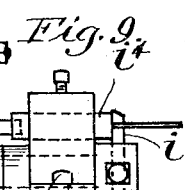
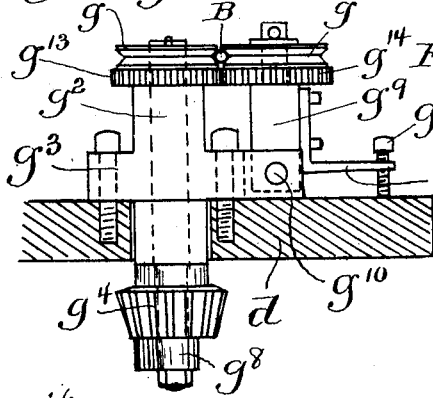
Witnesses:
A. D. Harrison
P. W. Pezzetti
Inventor:
J. C. Perry
by Knight Brown & Quinby
Attys.
THE NORRIS PETERS CO., PHOTO-LITHO., WASHINGTON, D. C.

UNITED STATES PATENT OFFICE.

JOHN C. PERRY, OF CLINTON, MASSACHUSETTS.

MACHINE FOR ELECTRICALLY WELDING WIRE FABRICS.

SPECIFICATION forming part of Letters Patent No. 633,214, dated September 19, 1899.

Application filed January 21, 1899. Serial No. 702,902. (No model.)

*To all whom it may concern:*

Be it known that I, JOHN C. PERRY, of Clinton, in the county of Worcester and State of Massachusetts, have invented certain new and useful Improvements in Fence-Making Machines, of which the following is a specification.

This invention has relation to machines for electrically welding crossed wires or strips of metal to form wire fabrics, such as screens, lathing, fences, gratings, &c.

The primary object of the invention is to provide a machine of the class named in which the feeding of the wire is continuous as contradistinguished from intermittent and in which the welding operation takes place during the feeding, whereby the producing capacity of the machine is greatly increased.

Another object of the invention is to provide the machine with certain other features of novelty for enhancing its general efficiency, rendering it simple in construction and causing it to run smoothly with a minimum expenditure of power.

To these ends the invention consists of a machine possessing certain features of novelty, all as illustrated upon the accompanying drawings, described in the following specification, and particularized in the appended claims.

Reference is to be had to the accompanying drawings, and to the letters marked thereon, forming a part of this specification, the same letters indicating the same parts or features, as the case may be, wherever they occur.

Of the drawings, Figure 1 represents a transverse section through a machine embodying my invention. Fig. 2 represents a longitudinal section through the machine, parts being left out for clearness. Fig. 3 represents a diagram of the electric circuits. Fig. 4 represents the current-collector. Figs. 5 and 6 represent one of the guides for the stay-wires. Fig. 7 represents an enlarged view of one of the welding devices. Figs. 8 and 9 represent one of the stay-wire cutters. Fig. 10 represents one of the stay-wire-feeding devices. Fig. 11 represents a portion of a cam and rack and the pinion adapted to engage therewith. Fig. 12 represents a section through one of the strand-wire guides. Figs. 13 and 14 represent the fixed or stationary electrode.

The machine which I have elected to show and describe for the purpose of disclosing my invention is only one embodiment of the latter, and consequently while I claim some of the details of construction and arrangement of parts thereof, yet it will be understood that so far as the general features are concerned the machine may be varied in many respects without departing from the spirit and scope of the invention.

For the sake of convenience I term the longitudinally-extending wires the "strand-wires" and those which are arranged to intersect the longitudinal wires I term the "stay-wires;" but it will be understood that I do not desire to have ascribed to said terms any limiting meaning and that in place of wires strips or bars may be used.

Referring to the drawings, the machine is shown as provided with standards $a$ $a$, connected by suitable cross-braces $a'$ $a^2$ $a^3$ $a^4$. The main shaft $b$ is journaled in bearings supported by said standards and is driven from an initial power-shaft $b'$ through the medium of a pinion $b^2$ and gear $b^3$. The initial power-shaft $b'$ may be driven in any suitable way, as by a belt. Upon the main shaft $b$ is mounted a frame consisting of spiders or octagonal heads $c$, to which are secured the electrode tables or supports $d$, the latter being insulated from the said heads, as clearly shown in Fig. 2. There are four of these electrode supports or tables, and at one end they project considerably beyond the head $c$ to receive the stay-wire reels, which will be referred to subsequently. Upon each support or table $d$ is supported a plurality of welding devices, a reel for a stay-wire, and means for feeding the stay-wires into position to be welded to the strand-wires, the latter being caused to pass over the tables and to move with the latter as they rotate with the shaft $b$.

The strand-wires are indicated at A, and they are drawn from reels (not shown) through straightening or tension devices $e$. (Shown in Fig. 1.) From thence they pass under an idler-roll $e'$, up and over the rotary frame, and down under a second idler-roll $e^2$ to a suitable take-up device. (Not shown.) If desired, I may employ in lieu of the rolls grooved wheels for the strand-wires. The strand-wires may vary in number and may be spaced as occasion requires. As shown, there are three of them, and consequently upon each table there are three welding devices, so that each length of said stay-wire is welded to all three of the strand-wires. The strand-wires are supported and guided by segmental guides $d'$, secured to the tables $d$ and insulated therefrom, said curved guides being shown in section in Fig. 12. Inasmuch as the welding devices which I shall hereinafter refer to grip the wires as the frame is rotated the said frame serves to feed said wires longitudinally, and hence by arranging said welding devices so that the welding is accomplished during a portion of the rotation of the said frame the machine operates continuously, so as to feed the strand-wires without intermission, and thereby produce a maximum amount of fence or other fabric.

The stay-wires are indicated at B, and the reels therefor are indicated at $f$, each reel being journaled upon a stud $f'$, extending radially outward from one end of its table or support $d$, and the wire passes between the feeding-wheels $g\ g'$, as shown in Fig. 10. The wheels are actuated intermittently, the wheel $g$ being secured upon the end of the shaft $g^2$, journaled in a bearing $g^3$ and extending through the table to receive a pinion $g^4$. Said pinion is arranged to intermesh with segmental rack-teeth $g^5$ on a ring $g^{20}$, mounted upon a stationary bracket $g^6$, attached to one of the standards $a$ of the machine. The upper portion of the ring is indicated at $g^7$ and is smooth, and on the said shaft $g^2$ is secured a cam $g^8$, having a smooth face adapted to contact with it after the pinion $g^4$ has been rotated sufficiently to feed the wire into the holders prepared to receive it, and thereby prevent any further rotation of the feeding-wheels. The wheel $g'$ is mounted upon a swinging stud-shaft $g^9$, fulcrumed at $g^{10}$ in the bracket $g^3$ and forced by a spring $g^{11}$ toward the roll $g$, so as to cause the wheels to grip the wire B with a yielding pressure. A set-screw $g^{12}$ is passed through the end of the spring and may be adjusted to vary the tension thereof. Gear-wheels $g^{13}\ g^{14}$ are secured upon the shafts $g^2\ g^9$ to cause the feeding-wheels $g\ g'$ to rotate in unison. As the frame rotates the pinions $g^4$ of the stay-wire-feeding devices on the several tables are brought successively into mesh with the rack $g^5$ to feed the stay-wires transversely of the strand-wires.

The holders for the stay-wires are indicated at $h\ h$ and are arranged between the welding devices. One of the said holders is shown in Figs. 5 and 6, and consists of a bracket $h'$, having an elongated bar or guide $h^2$, secured thereto by a bolt $h^3$, said bracket being secured to the table by suitable fastening devices $h^4$. The bar $h^2$ is provided with a longitudinal groove $h^5$, having a flaring mouth or entrance $h^6$, as shown in dotted lines in Fig. 5. Retainers are employed for maintaining the wires in the grooves, and each consists of a bar $h^7$, arranged to fit upon the bar $h^2$ and mounted upon an arm $h^8$, fulcrumed at $h^9$ to the bracket $h'$. A spring $h^{10}$ holds the retainer yieldingly upon the top of the bar $h^2$ and permits the arm $h^8$ to be swung backward about the fulcrum $h^9$ to allow the stay-wire to be moved out of the holder at the completion of the weld. In its end the retainer $h^7$ is recessed to register with the flaring mouth $h^6$ of the groove $h^5$ in the holder or guide $h^2$. When the feeding of the stay-wire takes place, the springs $h^{10}$ hold the retainers firmly against the guides or holders $h^2$, whereby the said wires are unable to move until they reach the position shown at 6 in Fig. 1.

In order to provide for the cutting of the stay-wires, I employ the devices shown in Figs. 8 and 9, said devices being arranged between the feeding-wheels and the first welding devices on each table. Each device comprises a cutter-blade $i$, mounted radially upon the end of a rock-shaft $i'$, journaled on a bearing-bracket $i^2$, secured by fastening devices $i^3$. On the bracket $i^2$ is a tubular guide for the wire, said guide being constructed at its end as a stationary shear or blade to coact with the movable blade $i$. The shaft $i'$ is provided on its other end with a crank-arm $i^5$, carrying a roller $i^6$, adapted to engage a stationary cam $i^7$, secured to one of the standards $a$, as shown in Fig. 1. The cam $i^7$ is so arranged that the stay-wire is fed its proper distance longitudinally of the table $d$ before the cutters are actuated to sever it.

On each table, as I have previously stated, the welding devices are equal in number to the strand-wires, and as all of the said devices are duplicates of each other I shall describe only one of them. Referring to Fig. 7, it will be seen that each device includes two electrodes $j$ and $k$. The former is removably placed in a groove $j'$ in a bracket $j^2$, attached by fastening devices to the table $d$. Said electrode has a shank $j^3$, engaged by a set-screw $j^4$, passed through said bracket $j^2$. The electrode is also provided with positioning prongs or fingers $j^5\ j^5$, which form a V-shaped groove to receive the stay-wire $b$. The electrode $k$ is also placed in a groove in a plunger $k'$, having a shank engaged by a set-screw $k^2$, passed through the end of the plunger. The plunger is mounted to slide in a bracket $k^3$, secured upon and insulated from the table $d$, and it is adapted to be moved toward the bracket $j^2$ by a spring $k^4$ and abutting at its upper end against a disk $k^5$ on a set-screw $k^6$, passed through the upper end of an arm $k^7$, secured to the bracket $k^3$. The spring $k^4$ is sufficiently strong to force the two wires A B together after they have been softened to effect a thorough weld, and hence during a portion of each rotation of the frame each plunger is held at its outermost limit of movement to permit the stay-wires to be fed into the grooves in the stationary electrodes and the strand-wires to be laid upon them. Hence under a flange $k^8$ of each plunger extends the shorter end of a lever $k^9$, having on its outer end a roll $k^{10}$, adapted to engage a stationary segmental cam $m$, secured to the cross-bars $a'$ $a^2$ $a^3$ $a^4$ of the main frame. The shorter end of each lever is equipped with a roller $k^{11}$ to engage the under face of the flange $k^8$. A spring $k^{12}$, attached to the lever $k^9$ and to another lever $n$, which I shall subsequently describe, operates to hold the roller $k^{11}$ in engagement with the flange $k^8$. In order to permit the stay-wires to leave the electrodes after the weld has been effected, I arrange to throw the electrodes $k$ to one side of the strand-wires, and hence the lower end of each plunger is offset or provided with a laterally-extending arm $k^{13}$, as shown in Figs. 1 and 2, the said electrode $k$ being secured to the end of the said arm. A pin $k^{14}$ extends from the plunger through a slot $k^{15}$ in the tubular portion of the bracket $k^3$, and the slot is so shaped that when the plunger is moved downward to force the movable electrode against the stationary electrode the plunger is rotated so that the two electrodes register, and when the plunger is moved upward by the lever $k^9$ it is also rotated to throw the movable electrode out of line with the strand-wire.

The transformer for each welding device is arranged radially inside of the table $d$, and the secondary coils $o$ are attached at their poles to the table and to the bracket $k^3$, respectively, as shown in Figs. 1 and 7. The primary coils $o'$ are in circuit with the source of electrical supply and also with circuit-controlling devices mounted upon the bracket $k^3$. The circuits are closed intermittently and then broken automatically when the weld is made. Each primary coil is connected to a collector-ring $p$, secured to the shaft $b$, while all the coils on each table are connected in multiple arc with a segment of a commutator-ring $p'$, secured upon the said shaft and insulated therefrom, the wires passing from the commutator through the shaft, as shown in Fig. 2. The circuits are shown in diagram in Fig 3, and it will be seen that there is a main circuit divided into four branch circuits, each branch circuit having three subcuits, branch circuits arranged in multiple arc, each subbranch circuit including an electrical welding device and a circuit-breaker. Brushes $q$ $q'$ are in contact with the collector-ring and the commutator, respectively, said brushes forming a part of a supply electrical circuit and being supported upon a stationary bracket $q^2$, mounted upon one of the stationary side standards $a$. As the shaft $b$ rotates the branch circuits through the electrical welding devices on the tables are successively closed when the brush $q'$ engages the segment $p'$, with which each branch circuit is electrically connected, and consequently a welding-current is formed in each secondary coil. Therefore in order to break each subbranch circuit when the weld is completed I arrange a circuit-breaker therein, consisting of a spring-tensioned stationary contact $r$, mounted in a bracket $r'$ on and insulated from the bracket $k^3$. The lever $n$, heretofore referred to, serves as a support for the movable contact $r^2$, which is insulated from said arm and is in the said subbranch circuit. The movable contact is held against the stationary contact normally by a bell-crank lever $n'$, fulcrumed at $n^2$ on the pivot for the lever $k^9$. One arm of said bell-crank carries a knife-edge $n^3$, which bears against a knife-edge $n^4$ on the lever $n$ and is held in contact therewith by a spring $n^5$. The other arm of the bell-crank is provided with a set-screw $n^6$, with which the flange $k^8$ is adapted to engage when the plunger moves toward the stationary electrode. The parts are so timed that after the stay-wire has been fed across the machine and has been severed the roller $k^{10}$ moves on the cam $m$ and allows the spring $k^4$ to force the movable electrode against the crossed wires A B. Then the circuit is closed through the brush $q'$ and the commutator-segment $p'$. As the wires heat they soften, and the spring $k^4$ forces the electrode $k$ in the plunger $k'$ still farther downward. This slight movement of the plunger is sufficient to swing the bell-crank $n'$ around its fulcrum and disengage the two knife-edges $n^3$ $n^4$, whereupon the spring $k^{12}$ immediately draws the movable contact $r^2$ away from the stationary contact $r$, and the circuit is immediately broken. Thereafter the roller $k^{10}$ engages the end of the cam $m$ and the plunger is moved to the outward extreme of its movement to permit the strand and stay wires to leave the electrodes and the holders, and as the lever $k^9$ is swung about its pivot it engages a finger $n^9$ on the lever $n$ and moves it inward to permit the spring $n^5$ to throw the bell-crank $n'$ about its pivot and cause the knife-edge $n^3$ to engage the knife-edge $n^4$. From this it will be seen that each branch circuit is closed automatically to close the circuits through all the welding devices on one table simultaneously and that each subbranch circuit is broken independently when the weld is completed. In order to permit the stay-wires to pass after they have been welded to the strand-wires, the cams $m$ are severed at $m'$ and the parts are separated, as shown in Fig. 1.

From this description it will be seen that as the frame rotates with the shaft $b$ the strand-wires are drawn from their reels and are laid across the said stay-wires, which are fed, each by its own feeding-wheels, into the guides prepared to receive it, and as the frame rotates once four stay-wires are welded to the strand-wires. Of course the number of tables for the stay-wires, the stay-wire-feeding devices, and the welding devices may be increased or diminished, as occasion requires.

The machine may be said to comprise a plurality of movable supports and an electric-welding device mounted on each support and adapted to weld the two contiguous parts or wires A B together while its support is in motion, the means for feeding the strand-wire to each welding device consisting of the electrodes of the preceding welding device. It is evident, however, that other feeding mechanism may be employed and the electrodes caused to release the wires as soon as the weld is completed or that if but one electric-welding device is used it will serve as the feeding device after the wires are clamped thereby.

Having thus explained the nature of the invention and described a way of constructing and using the same, although without attempting to set forth all of the forms in which it may be made or all of the modes of its use, I declare that what I claim is—

1. A machine of the character described, comprising a welding device, and continuously-rotating means for feeding a strand-wire to said welding device.

2. A machine of the character specified comprising means for feeding a strand-wire, and an electric-welding device traveling with said wire, to weld it while it is in motion.

3. A machine of the character specified comprising electric-welding devices arranged to grasp and weld crossed wires, and means for moving said welding devices to feed said wires, as they weld them together.

4. A machine of the character specified comprising a traveling holder for a stay-wire, and a traveling electric-welding device for welding a strand-wire to said stay-wire.

5. A machine of the character specified comprising an electric-welding device, a movable support for said device, and means for causing said device to weld two contiguous parts together while said support is in motion.

6. A machine of the character specified comprising a movable support, stay-wire-feeding devices on said support, and electric-welding devices on said support adapted to weld a strand-wire to said stay-wire.

7. A machine of the character specified comprising a rotary or revoluble support, means thereon for feeding a stay-wire, and an electric-welding device on said support for welding a strand-wire to said stay-wire.

8. A machine of the character specified comprising a rotary or revoluble support, means on said support for feeding a stay-wire, and an electric-welding device on said support adapted to weld a strand-wire to the stay-wire, said welding device being arranged to feed the strand-wire.

9. A machine of the character specified comprising a rotary or revoluble support, in combination with a stay-wire reel, means for feeding said stay-wire, an electric-welding device, and a cutter for said stay-wire, all mounted on said support and traveling therewith.

10. A machine of the character specified comprising an electric-welding device adapted to grasp a strand-wire and a stay-wire, and means for moving said welding device to cause it to feed the strand-wire, said welding device having provisions for automatically releasing said wires.

11. A machine of the character specified, comprising an electric-welding device adapted to grasp and weld a strand-wire and a stay-wire, means for moving said welding device to cause it to feed said strand-wire, and a holder for the stay-wire having provisions for releasing it when the weld is complete.

12. A machine of the character specified comprising a plurality of electric-welding devices, arranged in a circle, and a rotary frame for said welding devices, whereby said devices are enabled to weld a plurality of stay-wires in succession to a strand-wire.

13. A machine of the character specified comprising a rotary frame, a plurality of electric-welding devices on said frame, one preceding the other, means for supplying a strand-wire to said welding devices in succession, and means for supplying a cross or stay wire to each welding device whereby a plurality of stay-wires are welded to said strand-wire.

14. A machine of the character specified, comprising a rotary frame, a plurality of electric-welding devices on said frame, means for supplying a strand-wire to said welding devices in succession as the frame rotates; and for conducting said strand-wire away from said frame, and means for causing said welding devices to weld stay-wires in succession to said strand-wire.

15. A machine of the character specified comprising a rotary frame, a plurality of electric-welding devices on said frame, means for supplying a strand-wire to said welding devices in succession as the frame rotates; and for conducting said strand-wire away from said frame, and a cam for causing said welding devices to successively grasp the strand-wire and a stay-wire as the frame rotates.

16. An electric-welding device comprising two coacting electrodes and means for automatically translating one of said electrodes laterally with relation to the other.

17. An electric-welding device comprising two coacting electrodes, a plunger for moving one of said electrodes toward or from the other, and means for automatically rotating said plunger as it moves toward or from said other electrode.

18. An electric-welding device comprising two coacting electrodes, a plunger having a laterally-extending arm to receive one of said electrodes, and means for automatically imparting a rotative movement to said plunger.

19. A machine of the character specified comprising a holder for the stay-wire, a yielding retainer to coact with said stay-wire holder, and an electric-welding device including two electrodes and means for moving one of said electrodes toward and from and laterally relatively to the other electrode.

20. A machine of the character specified comprising a rotary frame having a plurality of tables, an electric-welding device located on each table, a main electric circuit having a branch circuit for each welding device, and means for automatically closing said branch circuits in succession.

21. A machine of the character specified comprising a rotary frame having a plurality of tables, a plurality of electric-welding devices on each table, a main electric circuit having a branch for each table, said branch circuit having a subbranch for each welding device on the table, means for automatically closing said main branch circuits in succession, and a circuit-controller located in each subbranch circuit.

22. A machine of the character specified comprising a rotary frame having a plurality of tables, an electric-welding device on each table, a branch circuit for each welding device, a collector rotating with the frame and forming a part of each branch circuit, a commutator rotating with said frame and having a section for each branch circuit, and brushes in a main supply-circuit contacting with said collector and said commutator.

In testimony whereof I have affixed my signature in presence of two witnesses.

JOHN C. PERRY.

Witnesses:
C. C. STECHER,
MARCUS B. MAY.